United States Patent [19]

Luppino et al.

[11] Patent Number: 5,732,929
[45] Date of Patent: Mar. 31, 1998

[54] ANTI-HAMMER PILOT OPERATED VALVE WITH TORTUOUS FLOW PATH BETWEEN INLET AND PILOT CHAMBER

[75] Inventors: Cosmo Luppino; Gregory Summerton, both of Adelaide, Australia

[73] Assignee: Technical Components, Pty. Ltd., Hendon, Australia

[21] Appl. No.: 750,109

[22] PCT Filed: May 31, 1995

[86] PCT No.: PCT/AU95/00325

§ 371 Date: Nov. 26, 1996

§ 102(e) Date: Nov. 26, 1996

[87] PCT Pub. No.: WO95/33155

PCT Pub. Date: Dec. 7, 1995

[30] Foreign Application Priority Data

May 31, 1994 [AU] Australia .................. PM6016

[51] Int. Cl.[6] .................. F16K 31/385; F16K 31/40
[52] U.S. Cl. .................. 251/30.04; 138/42; 251/38; 251/45; 251/126
[58] Field of Search .................. 251/30.03, 30.04, 251/30.05, 38, 45, 126; 138/42

[56] References Cited

U.S. PATENT DOCUMENTS

| 2,021,079 | 11/1935 | Mittendorf et al. | 138/42 |
|---|---|---|---|
| 3,593,957 | 7/1971 | Dolter et al. | 251/30.03 |
| 4,011,893 | 3/1977 | Bentley | 138/42 |
| 4,174,824 | 11/1979 | Kolze | 251/30.03 |
| 4,387,878 | 6/1983 | Zukausky | 251/45 |
| 4,500,067 | 2/1985 | Zukausky | 251/45 |
| 4,502,661 | 3/1985 | Swanson | 251/30.04 |
| 4,796,660 | 1/1989 | Bron | 138/42 |
| 4,860,990 | 8/1989 | Fukuzawa et al. | 251/30.03 |
| 5,269,333 | 12/1993 | Richmond | 251/30.05 |
| 5,299,775 | 4/1994 | Kolze | 251/30.03 |

FOREIGN PATENT DOCUMENTS 0099580  6/1983  Japan .................. 261/30.03

*Primary Examiner*—George L. Walton
*Attorney, Agent, or Firm*—Baker, Maxham, Jester & Meador

[57] ABSTRACT

A soft closing liquid valve of the pilot control type including an inlet chamber, an outlet chamber, a third pilot chamber, a first conduit for liquid communication between the inlet chamber and the third chamber and a second conduit for fluid communication between the third chamber and the outlet chamber whereby the liquid flow rate through the first conduit is reduced by the conduit including a tortuous path means so that the flow rate into the third chamber is substantially reduced and when the second conduit is closed causes the third chamber to fill at a slower rate than in conventional pilot controlled valves, the resultant slow rate of change of pressure causing a slow closure of the flow path between the inlet and outlet chambers by a diaphragm thus minimizing water hammer. The first conduit may include a third conduit and a fourth chamber in liquid communication with the tortuous path, the third conduit acting as a filter means for the tortuous path by selecting its cross-sectional size to be smaller than that of the tortuous path. In another embodiment, the first conduit is formed through and using the peripheral bead of the diaphragm.

14 Claims, 9 Drawing Sheets

ANTI-HAMMER PILOT OPERATED VALVE WITH TORTUOUS FLOW PATH BETWEEN INLET AND PILOT CHAMBER

TECHNICAL FIELD

This invention relates to improvements in fluid flow-control devices of the type commonly known as pilot operated valves, the improvements causing a reduction in water hammer.

BACKGROUND ART

Valves are used to control flows of fluids, liquids and gases in piping systems and machinery. Many various types of valves are used for various applications. One of these is the fluid valve known as a pilot operated valve which is used in many industries such as the irrigation, petroleum and the white goods industry. Within the white goods industries in particular these valves may be used for washing machines, dishwashers and refrigerators.

These valves are in general controlled by, although not limited to, an electromagnetic means, typically solenoid and servo actuated. The controller, such as a solenoid, is not used to directly control the flow path of the fluid but rather acts upon a diaphragm which controls the water flow by sealing a suitable seat within the main flow path. In its simplest principle, the solenoid is used to control the pressure difference and thus the total force acting on both sides of the diaphragm causing it to experience a net force and move within its movement range. The diaphragm is constructed with an inlet bleed port allowing fluid to flow from an inlet chamber through the diaphragm into a closed chamber. To open the valve and allow the fluid to flow from the inlet chamber to an outlet chamber the diaphragm must be moved off the seat. This is achieved by actuating the solenoid to reveal an outlet bleed port, usually also constructed in the diaphragm, which bleeds fluid from the closed chamber into the outlet chamber. The outlet bleed port is designed to allow fluid to flow from the closed chamber at a rate that is faster than that of the fluid flow into the closed chamber through the inlet bleed port. This causes a pressure difference on the opposite sides of the diaphragm since the pressure in the closed chamber is now less than that in the inlet chamber. Depending on the total force experienced by the diaphragm (which is pressure times area) the diaphragm moves off the seat allowing fluid to flow from the inlet chamber directly into the outlet chamber. Conversely, to close the valve the solenoid is activated to seal the outlet bleed port thus increasing the pressure in the closed chamber since fluid still flows into the closed chamber through the inlet bleed port changing the net force exerted on the diaphragm and thus causing the diaphragm to move onto the seat closing off the main flow.

The drawback to this type of an arrangement is the fact that the solenoids, being electromagnetically controlled, are relatively fast acting and in conjunction with the servo actuator principle, open and close the outlet bleed port very quickly thus causing the valve to open and close very quickly. The closure of the main fluid flow path in so short a time causes an abrupt change of the fluid flow.

An abrupt change of fluid flow in a closed conduit system produces pressure changes or surges. This is commonly known as water hammer, aptly labelled due to the audible and mechanical slamming of the valves and conduit system. For fluids other than water, such as in the petroleum industry, the term used is surge.

The fundamental physical theorem describing water hammer is irrespective of the fluid used in the conduit, and can be equally well applied to petrol, oil or water and involves the physical characteristics of the fluid and conduit system only. Water hammer pressures are direct functions of the abrupt change in the fluid velocity and the surge-wave velocity in the system which are independent of the length of the conduit. The surge-wave velocity of the system is equivalent to the velocity of sound within that system and depends upon the diameter, thickness, and elasticity of the conduit and the compressibility and specific gravity of the fluid. The classic elastic-wave theory of water hammer has been well documented and will not be discussed here in further detail.

In the white goods industry where the liquid is water, the valves have to be constructed to operate under a diverse range of conditions including a large range of water temperatures and water quality. Various entrained solids can be found in water, for example grit, fibres and sludge, and it has been necessary to introduce a filter system in the flow path before it reaches the valve, generally incorporating it into the inlet of the valve. However, the size of the filter dictates the minimum sizes of the inlet and outlet bleed ports so as to prevent the blockage of these ports due to particles passing through the filter. To this end, the inlet bleed ports are of such a size that allows a high flow rate, thus resulting in fast action of the diaphragm when the outlet bleed port is closed and therefore a sudden closure of the main flow path, before the upstream fluid flow has had time to reduce its kinetic energy and stop. This sudden deceleration of the upstream flow generates high impulse pressures which, in the case of water conduit or plumbing systems, are released to the plumbing system as water hammer.

Water hammer does not only produce audible annoyance, but the resulting pressure pulse within the piping system places stress on all the plumbing components. This occurs in both hot and cold water systems, and for a range of pressures, whether mains pressure or gravity feed, although the effect is proportional to the initial water pressure.

Whilst various devices do exist which are directed towards minimising water hammer they are usually expensive, additional to the plumbing system, difficult to install and do not offer the dynamic range required for various operating conditions. Furthermore they are usually quite complicated and are affected by the homogeneity of the fluid. In addition success of water hammer elimination is inversely proportional to the water flow distance between the valve and water hammer minimisation device. This is sometimes difficult not only due to the physical constraints of the piping system but the machine in question as well.

It has been discovered that water hammer may be substantially reduced when the flow rate through the inlet bleed port is substantially reduced as compared to standard operating pilot control valves. Reduction of the flow rate causes the rate of change of pressure in the closed chamber to vary at a slower rate this causing the rate of change of the net force experienced by the diaphragm to decrease causing the resultant motion of the diaphragm and thus the rate of closure of the diaphragm to be slowed. This then results in the valve fully closing through a longer period of time and not substantially suddenly as has hitherto been the case leading to a reduction of water hammer.

One way of reducing the flow rate through the inlet bleed port is to physically reduce its size. However, as mentioned above, there may be various entrained solids in water which may block the inlet bleed port causing the valve to be inoperational. It has also been discovered that the flow rate through the inlet bleed port may be controlled by introducing a limiting of the flow rate between the inlet bleed port and the closed chamber. The limitation may be accomplished simply by a pipe of a small cross-section reducing the flow rate by capillary action. This though has also been found to be unsatisfactory due to potential blockage problems. Furthermore, the size of the apertures required which would lead to a substantial reduction in water hammer are difficult to manufacture.

This invention seeks to substantially reduce water hammer by limiting the flow rate through the diaphragm from the inlet chamber to the closed chamber. The flow rate into the closed chamber is reduced not due to the physical size of the inlet bleed port but by introducing a flow path so shaped that causes friction losses within the fluid which acts to slow it down. Additionally, the invention may also include a filtering means that determines the maximum size of particles that enter the flow path and thus ensures that the flow path does not become blocked.

The introduction of flow paths in fluid flow systems has been used, for example, in the irrigation industry. There, a larger diameter pipe, usually made of plastic is permeated all along its length by smaller apertures. Each of these apertures has then connected to it a length of smaller tubing which for convenience is wrapped around the pipe. Even under substantially high pressures water is seen to slowly drip from the ends of the small tubing. This is the well known drip irrigation system.

By introducing a flow path one reduces the flow rate of the fluid by sapping the kinetic energy of the fluid. Various flow paths exist, some examples being the laminar or capillary flow path, the vortex flow path, and the tortuous flow path. These types of flow paths induce frictional losses in the fluid stream and therefore convert the kinetic energy of the fluid into other energy types such as sound and heat.

DISCLOSURE OF THE INVENTION

Therefore in one form of the invention though this need not be the only or indeed the broadest form there is proposed a soft closing liquid valve including an inlet chamber and an outlet chamber in liquid communication with each other, a third chamber having a first opening, a seat defining a second opening between the inlet chamber and the outlet chamber, a diaphragm assembly and opposed facing said seat and positioned across said first opening, said diaphragm assembly being movable for contacting said seat so as to provide a closure between the inlet and the outlet chambers, a fourth chamber in liquid communication with the inlet chamber and third chamber, at least two first conduits for liquid flow between the inlet chamber and the fourth chamber, a second conduit for liquid flow between the fourth chamber and the third chamber wherein the cross-sectional area of the second conduit is greater than the cross-sectional area of each of the first conduits thereby causing a filtering of debris in the liquid flowing to the fourth chamber, a third conduit for liquid flow between the third chamber and the outlet chamber, a plunger movable in response to a control means to at least each of two positions, in one said position allowing for the passage of liquid through the third conduit and in the at least one other said position preventing the flow of liquid through the third conduit, wherein the second conduit is so shaped to provide a continuous extended tortuous path and thus a restricted flow of liquid, wherein the third conduit is so shaped so as to allow a greater flow of liquid through it than that through the second conduit and wherein in use the valve is closed by the plunger moved to close the flow of liquid through the third conduit, the liquid flow into the third chamber through the first conduit, fourth chamber and second conduit resulting in a pressure increase on the diaphragm assembly causing it to move onto the seat and close direct liquid flow between the inlet and the outlet chambers, whereby the tortuous path shape of the second conduit causes a slow liquid flow rate into the third chamber and thus a correspondingly slow increase in pressure and a correspondingly slow rate of diaphragm assembly movement towards the seat resulting in the valve being soft closing. The diaphragm assembly includes several elements, among them being a flexible membrane, often itself referred to as a "diaphragm." The term "diaphragm" as used herein will generally be employed to refer to the diaphragm assembly.

In preference there are at least four first conduits. In this way if one of the conduits is blocked by a particle contained within the liquid, there will still be sufficient flow though the other three conduits into the fourth chamber and the valve will still be operative.

In preference the first conduit or conduits is an aperture or apertures in the diaphragm allowing liquid flow into the fourth chamber, said fourth chamber contained within the diaphragm, said diaphragm further including the second conduit allowing for liquid flow into the third chamber.

In preference the third conduit is contained within the diaphragm.

Such an arrangement allows for use of a standard valve body whether or not the diaphragm is standard of soft-closing. This feature is particularly attractive for it may not always be necessary to use a soft-closing diaphragm, although there should be the opportunity to be able to use if if the need arises.

In a preferred embodiment the second conduit is a tortuous path the provides a restricted flow of liquid through the diaphragm from the fourth chamber to the third chamber.

The tortuous path allows for a restrictive flow of liquid without depending on the actual cross-sectional size of the path.

In preference the first conduit or conduits are so shaped so that their cross-sectional area is less than the cross-sectional area of the second conduit.

Therefore whatever particles pass through the first conduit will also pass through the second conduit without blockage occurring.

It preference the cross-sectional area of the first conduit or conduits is approximately 0.25 mm$^2$ and the cross-sectional area of the second conduit is approximately 0.64 mm$^2$.

In preference the control means is an electromagnetic solenoid means. However, the control means may equally well be a simple hand operated valve, such as a tap.

In preference the diaphragm is constructed of three components, the first component being a flexible sealing member adapted to effect a seal in contact with the said seat so as to prevent liquid flow between the inlet and the outlet chambers, the second component being a tortuous path disk of substantial rigid construction and adapted to be held within the flexible sealing member, and the third component being a rigid tortuous path cap adapted to be bonded to the tortuous path disk.

In preference the first conduit or conduits is an aperture or apertures in the flexible seal member, the fourth chamber is a conduit with all its sides except the top side defined as a groove in the flexible seal member, the top side being provided by the tortuous path disk which defines the fourth chamber, the second conduit being a tortuous path defined by all its sides except the top side by the tortuous path disk said tops side being provided by the tortuous path cap which thus defines the second conduit, the tortuous path disk including an inlet aperture and an outlet aperture for the second conduit.

In preference the fourth chamber is a toroidal chamber or flow path.

In preference the second conduit is located in the body of the soft closing valve.

In preference the first conduit, fourth chamber and second conduit are located in the tortuous path disc.

In a still further form of the invention there is proposed a soft closing liquid valve including an inlet chamber and an outlet chamber in liquid communication with each other, a third chamber having a first opening, a seat defining a second opening between the inlet chamber and the outlet chamber, a diaphragm facing said seat and positioned across said first opening, said diaphragm being movable for contacting said seat so as to provide a closure between the inlet and the outlet chambers, a fourth chamber in liquid communication with the inlet chamber and third chamber, at least two first conduits for liquid flow between the inlet chamber and the fourth chamber, a second conduit for liquid flow between the fourth chamber and the third chamber wherein the cross-sectional area of the second conduit is greater than the cross-sectional area of each of the first conduits thereby causing a filtering of debris in the liquid flowing to the fourth chamber, a third conduit for liquid flow between the third chamber and the outlet chamber, a plunger movable in response to a control means to at least each of two positions, in one said position allowing for the passage of liquid through the third conduit and in the at least one other said position preventing the flow of liquid through the third conduit, wherein the second conduit is so shaped to provide a tortuous path and thus a restricted flow of liquid, wherein the third conduit is so shaped so as to allow a greater flow of liquid than that through the second conduit, and wherein when the plunger is controlled so as to open the flow of liquid through the third conduit, the liquid flow out of the third chamber through the third conduit into the outlet chamber is greater than the liquid flow into the third chamber through the first conduit, fourth chamber and second conduit, this difference in flow rate resulting in a force difference on the diaphragm causing the diaphragm to move off the seat and allow for direct liquid flow between the inlet and the outlet chambers.

BRIEF DESCRIPTION OF THE DRAWINGS

To aid in further understanding of this invention the invention will now be described in more detail with reference to the following figures.

BEST MODE FOR CARRYING OUT THE INVENTION

Figure 1:
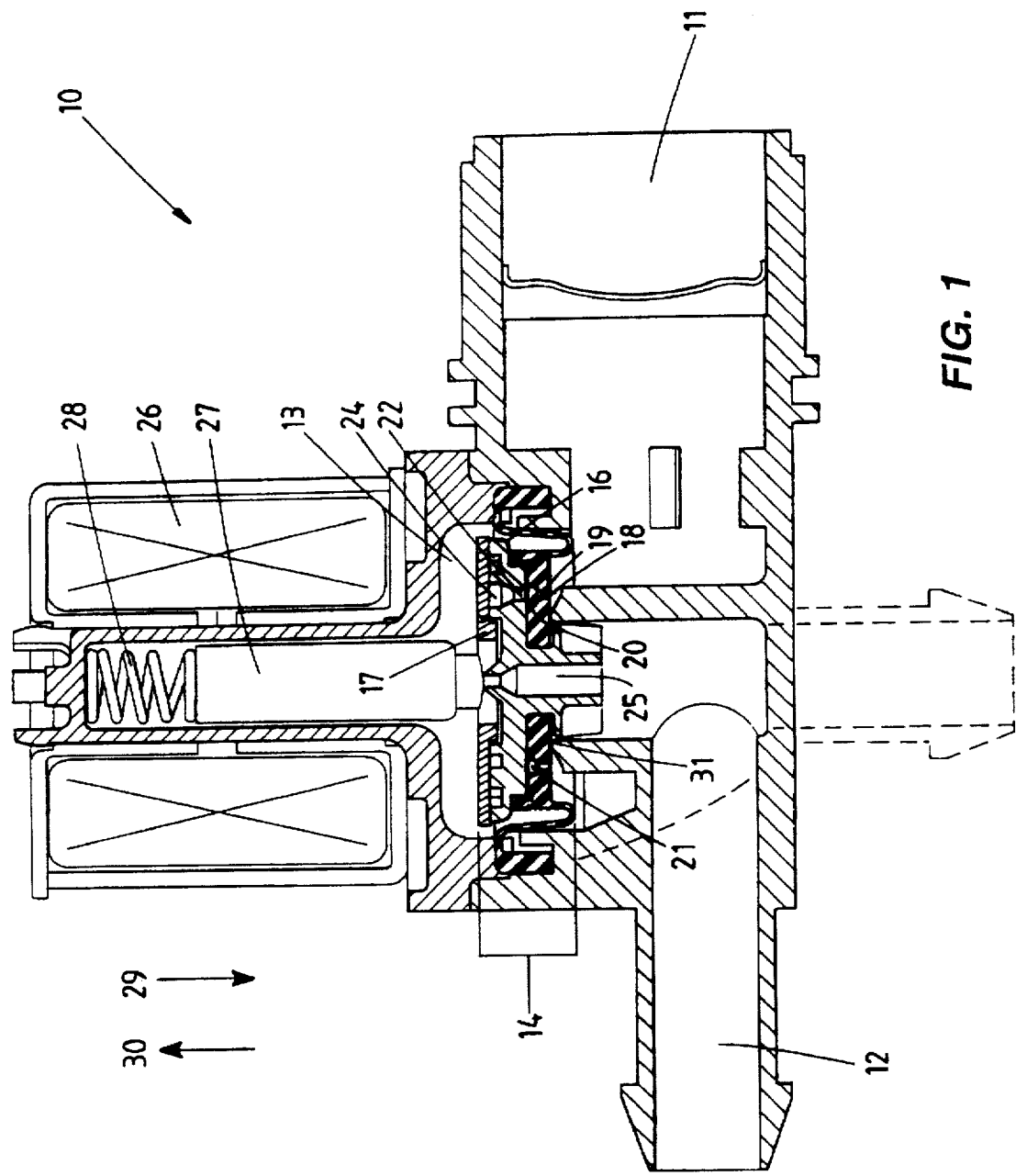
FIG. 1 shows a typical cross section of the soft closing valve in a closed position.

Referring now to the figures in detail, there is shown in FIG. 1 a cross-sectional view of one embodiment of a typical soft closing valve 10 including an inlet chamber 11, outlet chamber 12, third chamber 13, disc-diaphragm 14. The disc-diaphragm 14 includes a sealing diaphragm 15, a tortuous path disc 16 and a tortuous path cap 17 stacked up on each other in that order. At least one primary inlet port 18 is located on the sealing diaphragm 15 and results in fluid communication between inlet chamber 11 and fourth chamber 21 through primary passageway 19 and primary outlet port 20. There is a further secondary inlet port 22 located on the underside of tortuous path disc 16 resulting in fluid communication of fourth chamber 21 with the third chamber 13 via a secondary passageway 24 and a secondary outlet port 23 which in this embodiment is located on the side of tortuous path disc 16. The third chamber 13 is in fluid communication with outlet chamber 12 via outlet port 25. The valve is electrically controlled by electric current (not shown), which controls solenoid 26. When the current is on, the solenoid 26 is energised causing a magnetic field to hold plunger 27 in place against spring 28. When the current is switched off, this causes the magnetic field of the solenoid 26 to cease thereby releasing plunger 27 which is acted upon by spring 28 moving it until it rests on outlet port 25 thus sealing it. This causes the third chamber 13 to pressurise since it is in fluid communication with inlet chamber 11 through primary passageway 19, fourth chamber 21 and secondary passageway 24.

The secondary passageway 24 is so shaped so as to cause the direction of the fluid flow to change a number of times, i.e. it is a tortuous path, thereby reducing the flow rate into the third chamber 13. By choosing specific physical characteristics of the secondary passageway 24 to result in a particular flow rate the time taken to fill the volume of the third chamber 13 can be increased as compared with the time the third chamber 13 were to take to fill up if the secondary passageway 24 was not flow reducing or if in fact there was no secondary passageway. The force experienced by the diaphragm is proportional to the pressure times the area that pressure is exerted upon. When the force in downward direction 29 on disc-diaphragm 14 due to the pressure in third chamber 13 is greater than the force in the upward direction 30 caused by pressure in the inlet chamber 11 the disc-diaphragm 14 will move in the downward direction 29 until it sits onto valve seat 31 closing the fluid communication path between the inlet chamber 11 and outlet chamber 12 which up until this time was open. Since the increase in the pressurising time of the third chamber 13 causes an appropriate increase in the time over which the disc-diaphragm 14 is forced onto the valve seat 31, the closing of the direct flow path between inlet chamber 11 and outlet chamber 12 is also slower resulting in the flow rate between the inlet and outlet chambers changed at a slower rate, thereby substantially eliminating sudden pressure rises which are responsible for water hammer.

Figure 2:
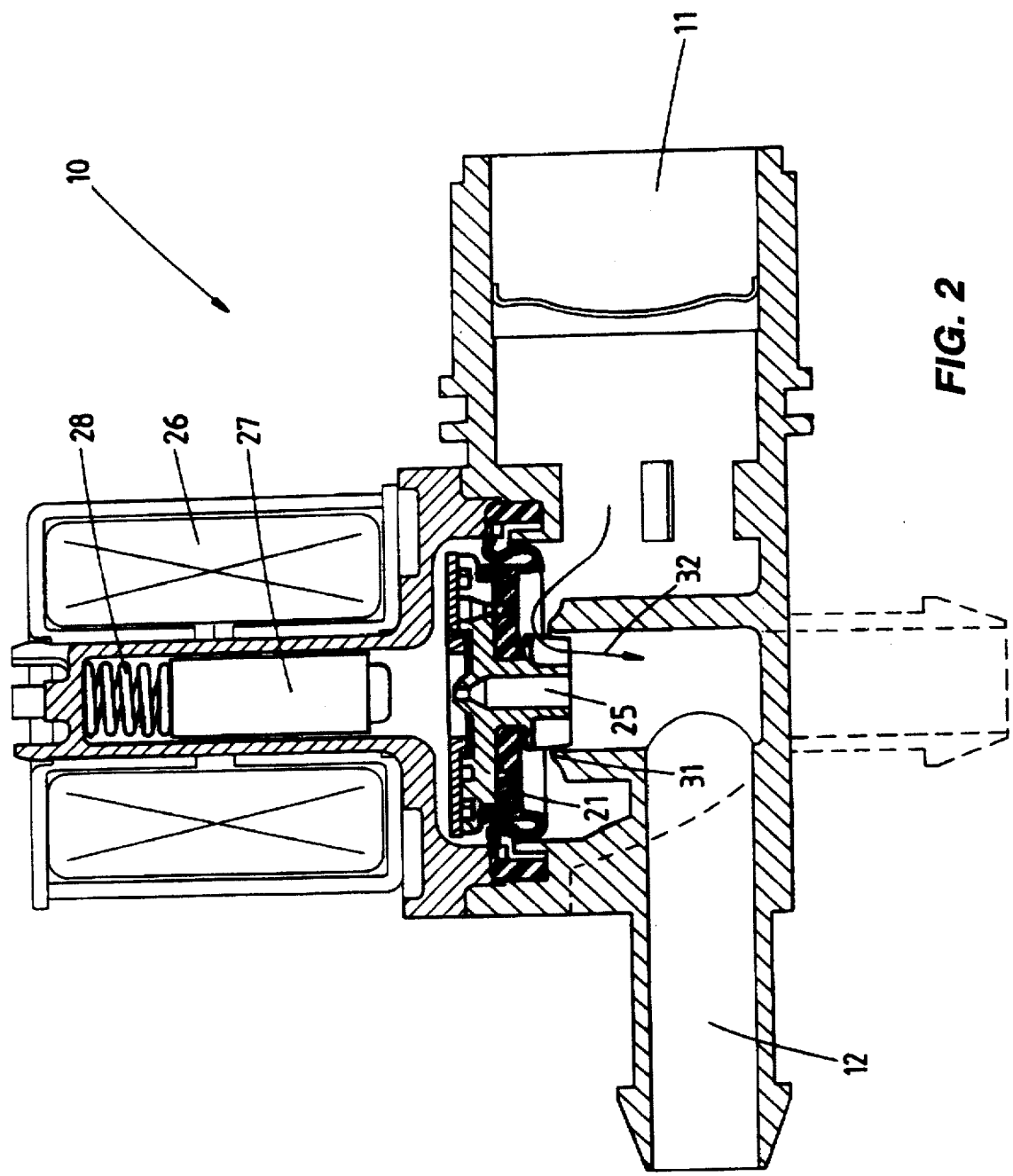
FIG. 2 shows a typical cross section of the soft closing valve in an open position.

To open the valve and allow fluid flow 32 directly from the inlet chamber 11 to the outlet chamber 12 as in FIG. 2 the solenoid is switched on whereby the magnetic field (appropriately chosen to exert a stronger force than the spring) causes the plunger 27 to be lifted from the outlet port 25 allowing fluid to flow directly from the third chamber 13 into the outlet chamber 12 through the outlet port which in this embodiment extend through the centre of disc-diaphragm 14. The outlet port 25 is chosen so that it allows a greater flow rate out of than into the third chamber 13 the latter occurring as described above, i.e. through the primary passageway, fourth chamber and the secondary passageway. This causes the pressure in the third chamber 13 to drop, so that the total force on the disc-diaphragm 14 will change causing it to lift upwards in direction 30 from the valve seat 31 and thus allowing a direct flow to occur along flow path 32 between the inlet and outlet chambers 11 and 12.

Figure 3:
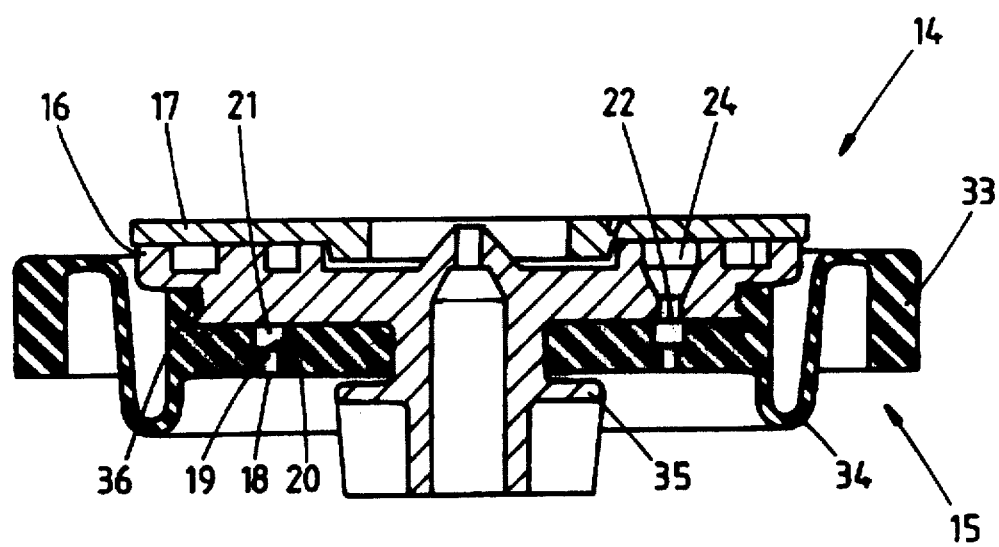
FIG. 3 is a cross-sectional view of the diaphragm used in the soft closing valve of FIG. 1 showing the sealing diaphragm, the tortuous path disc and the tortuous path cap.
Figure 4A:
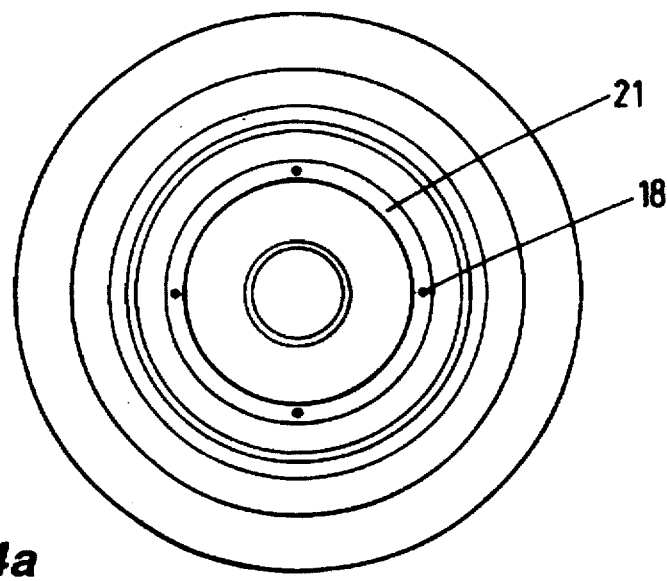
FIG. 4a and b is a top view and a cross-sectional view respectively of the sealing diaphragm of FIG. 3.
Figure 4B:
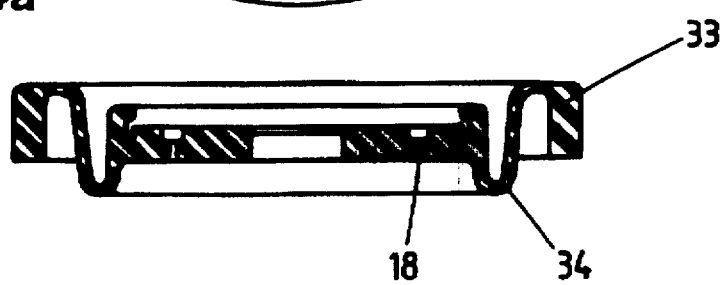

FIG. 3 is a cross-sectional view of the disc-diaphragm 14 as shown in FIGS. 1 & 2. In this embodiment the disc-diaphragm 14 is constructed from three components, the sealing diaphragm 15 which sits onto valve seat 31 controlling the flow path between the inlet and outlet chambers, tortuous path disc 16 and tortuous path cap 17 all of which are shown in more detail in FIGS. 4a,b, 5a,b,c, and 6a, b.

The sealing diaphragm 15 is usually constructed of a suitable material such as rubber which allows flexibility and resistance to wear. In this embodiment it incudes outer edge 33 which connects to the main body of the sealing diaphragm 15 via flexible sealing member or membrane 34 allowing the central part of the body of the sealing diaphragm 15 to move with respect to outer edges 33. The sealing diaphragm includes at least one, usually between 4 to 12, primary inlet ports 18 which are located so that they are always in fluid communication with the inlet chamber 11. In this embodiment this means that they must be located on the periphery of the central part of the sealing diaphragm 15 beyond the circumference of the valve seat 31 so that they are in fluid communication with the inlet chamber 11 regardless whether or not the sealing diaphragm 15 sits on the valve seat 31 (as shown in FIG. 1).

The one or more of the primary inlet ports 18, corresponding primary passageways 19 and primary outlet ports 20 allow fluid communication between fourth chamber 21 and inlet chamber 11. In this embodiment the fourth chamber 21 is a conduit located on the top side of the sealing diaphragm 15, with the fourth chamber 21 defined as a closed chamber when the tortuous path disc 16 is fixed on top of the sealing diaphragm 15. It must be understood however that the location of the fourth chamber 21 is a matter of convenience only and could equally well be located on the underside of the tortuous path disc. In this particular embodiment the fourth chamber 21 is a toroidal ring with four primary inlet ports 18 positioned symmetrically around the toroidal ring, thereby the fourth chamber acting as a flow channel. it is also to be understood that the primary passageways 19 may be only as long as is the thickness of the sealing diaphragm 15; in such a case there is effectively only a primary inlet port or aperture 18 and there is no specific need to define a primary inlet port, passageway and outlet port. It is therefore to be understood that in this invention reference to primary aperture 18 may define both examples.

The tortuous path disc 16 includes in its construction secondary inlet port 22, secondary passageway 24, in this case a tortuous path with 158 turns, and secondary outlet port 23 which allow fluid communication between the fourth chamber 21 and the third chamber 13. The secondary inlet port 22 is constructed so as to be located at the same radius from the centre of the tortuous path disc 16 as is the location of the toroidal fourth chamber 21. In this way, the tortuous path disc 16 can be rotated in any position (around its central axis) and still allow fluid communication of the secondary inlet port 22 with the fourth chamber 21. This feature is extremely useful for it eliminates the need to perfectly align a primary aperture 18 with the secondary inlet port 22 as may occur in situations where the fourth chamber 21 is asymmetrical or in fact there is no fourth chamber 21 and the primary aperture 18 feeds directly into the secondary inlet port 22.

The tortuous path disc 16 also includes wings 35 which are always located within valve seat 31 which prevent the disc-diaphragm from moving horizontally (relative to the drawings in this case) thus ensuring that there is no potential leakage if the outlet port 25 is displaced with respect to plunger 27.

In this particular embodiment, the secondary passageway 24 is a tortuous path with a relatively constant cross-section which is manufactured on top of the tortuous path disc 16. To enclose the secondary passageway 24 there is a tortuous path cap 17 which sits on top of the tortuous path disc 16 and thus defines the secondary passageway 24. The secondary outlet port 23 in this embodiment is located on the side of the tortuous path disc 16 and does not extend through the tortuous path cap 17. The reason for this is that it has been found easier to bond the tortuous path cap 17 to the tortuous path disc 16 if the secondary outlet port 23 does not extend through the tortuous path disc 16. However, at times this may be necessary to do so, and this invention does not limit the position of the secondary outlet port 23 unduly, the only requirement be that it allows fluid communication into the third chamber 13. The secondary passageway 24 compromises a series of bends in a typical double ring configuration. The water flows though the bends finally coming out of the secondary outlet port. Each of the bends changes the direction of the flow thereby inducing kinetic energy losses and acts to impede the flow. The cumulative effect of each bend causes a significant drop in the flow rate. The actual physical cross-sectional shape of the flow path is not critical, and may vary from circular to rectangular to non-symmetrical.

The disc-diaphragm 14 in this particular embodiment includes the sealing diaphragm 15, the tortuous path disc 16 and the tortuous path cap 17 which may be held together by suitable means. (Alternate constructions will be discussed later). In this particular example they may be joined together by suitable means. For example, the tortuous path disc 16 and the sealing diaphragm 15 may be held together by use of a circumferential barb seal 36, whilst the tortuous path cap 17 may be heat bonded or ultrasonically bonded to the tortuous path disc 16.

The relative dimensions of the soft closing valve 10 are shown on the figures. The dimensions may be changed to suit the particular application. However, in the case where the soft closing valve 10 does include primary apertures 18, it is important to ensure that the cross-sectional size of the primary aperture 18 is less than the cross-sectional size of the secondary passageway 24. This is so that in the case where the fluid may contain entrained solids or grit, the secondary passageway 24 does not become blocked and render the valve inoperative. In the case say involving the soft closing valve used in washing machines, the primary apertures 18 are of a size typically 0.5 mm whilst the secondary inlet, passageway and outlet are no smaller than 0.75 mm. This ensures that no particles greater than approximately 0.6 mm will enter the secondary passageway, since in the case of rubber diaphragms it has been found that particles up to a size of 0.6 mm can pass through an aperture of 0.5 mm. For that reason there is a plurality of primary apertures 18 so that even if several become blocked, there are sufficient primary unblocked apertures left to allow fluid to flow into the fourth chamber 21. Furthermore, when the pressure in the third chamber 13, the fourth chamber 21 and the inlet chamber 11 approach each other and the valve 10 closes, it has been found that any particles blocking a primary aperture 18 tend to simply fall off. The primary apertures 18 thus perform the important function of filtering the fluid to ensure that the secondary passageway 24 which is tortuous does not become blocked.

The other relative dimensions of the soft closing valve are typically;

valve 59 mm high, 79 mm widest inlet chamber 20 mm diameter;

outlet chamber 8 mm diameter (typically 5-16 mm), primary aperture 0.5 mm, secondary passageway and outlet port 0.8 mm cross-section, secondary inlet port 0.75 mm diameter, tortuous path disc 21.66 mm diameter, tortuous path disc wings 18 mm diameter, tortuous path cap thickness 0.8 mm, tortuous path cap diameter 22 mm, outlet port 0.8 mm diameter.

Figure 5A:
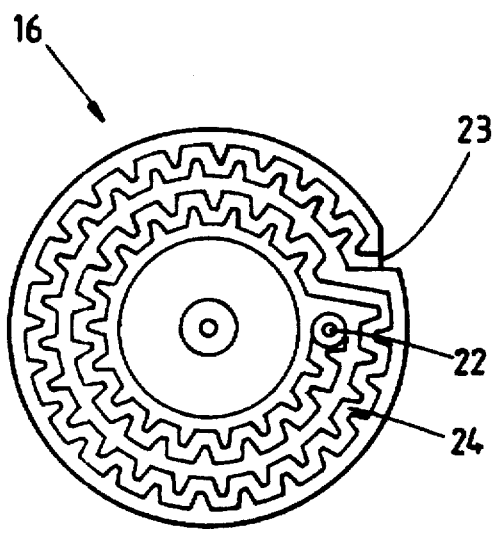
FIGS. 5a, b and c is the top view, cross-sectional view and underside view respectively of the tortuous path disc of FIG. 3.
Figure 5B:
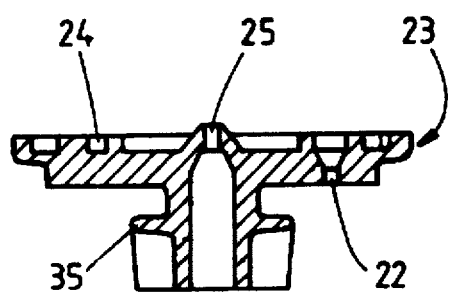
Figure 5C:
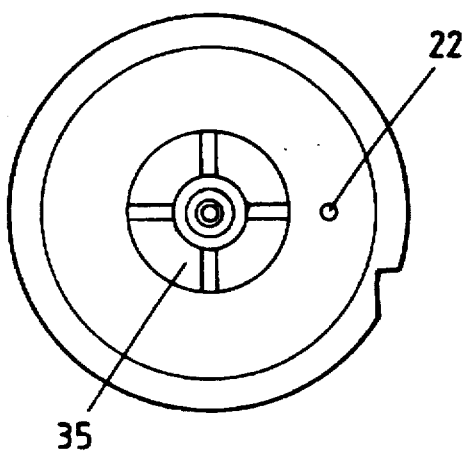
Figure 6A:
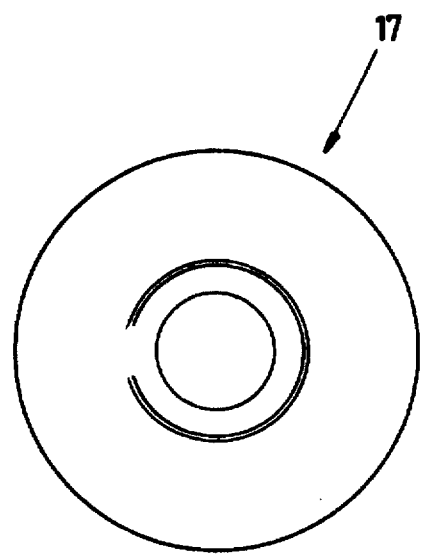
FIGS. 6a and b is the top view and the cross-sectional view respectively of the tortuous path cap of FIG. 3.
Figure 6B:
Figure 7:
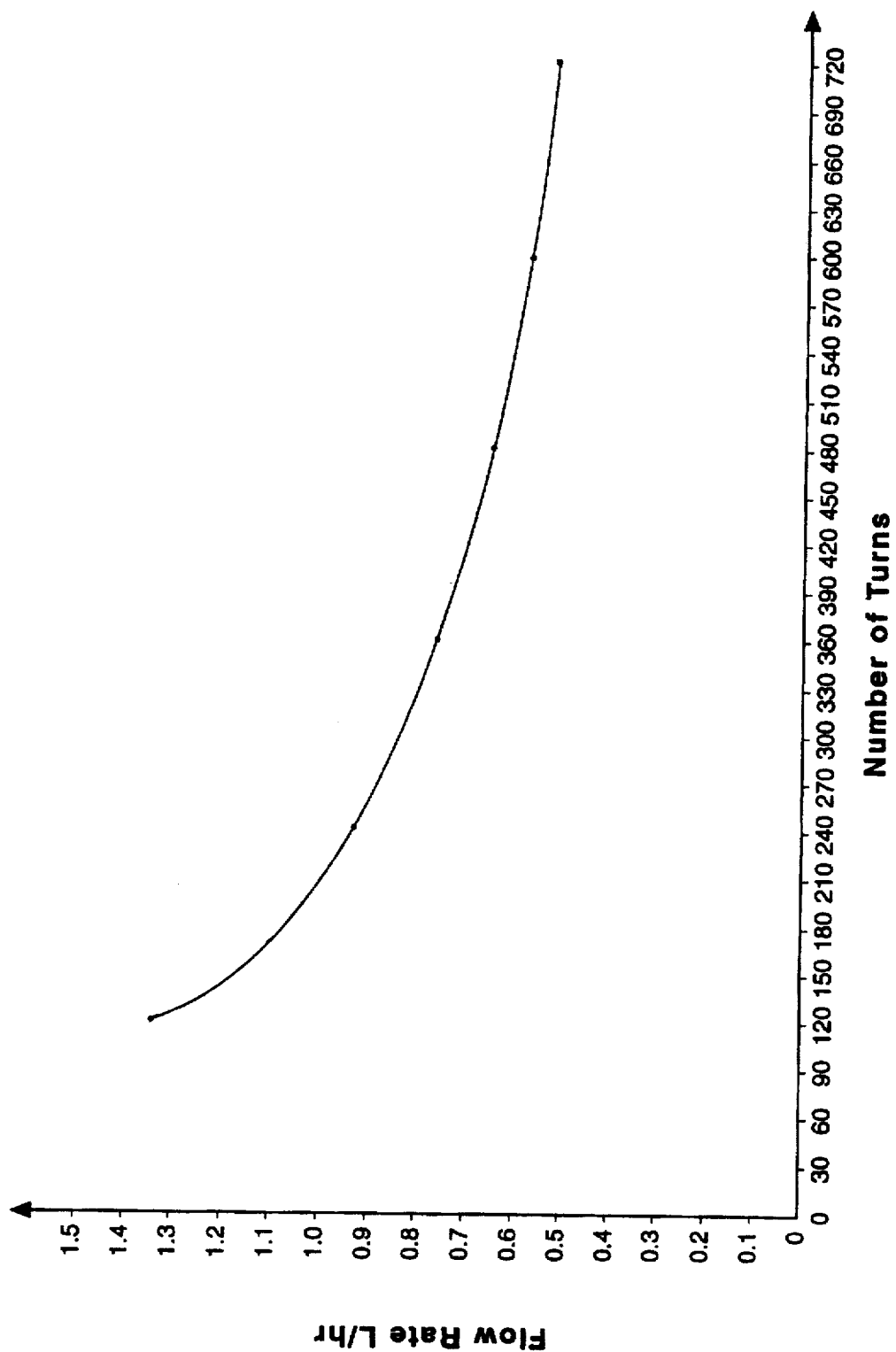
FIG. 7 is an empirically determined plot of the flow rate versus number of turns for a tortuous path at a constant temperature and pressure.

FIG. 7 shows an empirically derived curve describing the flow rate as a function of the number of turns for the secondary passageway of the general construction as in FIG. 5a for water at a pressure of 50 kPa and a temperature of 18 degrees C. The flow rate is clearly seen to decrease as a function of increasing the number of 90 degree bends in the secondary passageway which is clearly tortuous.

Figure 8:
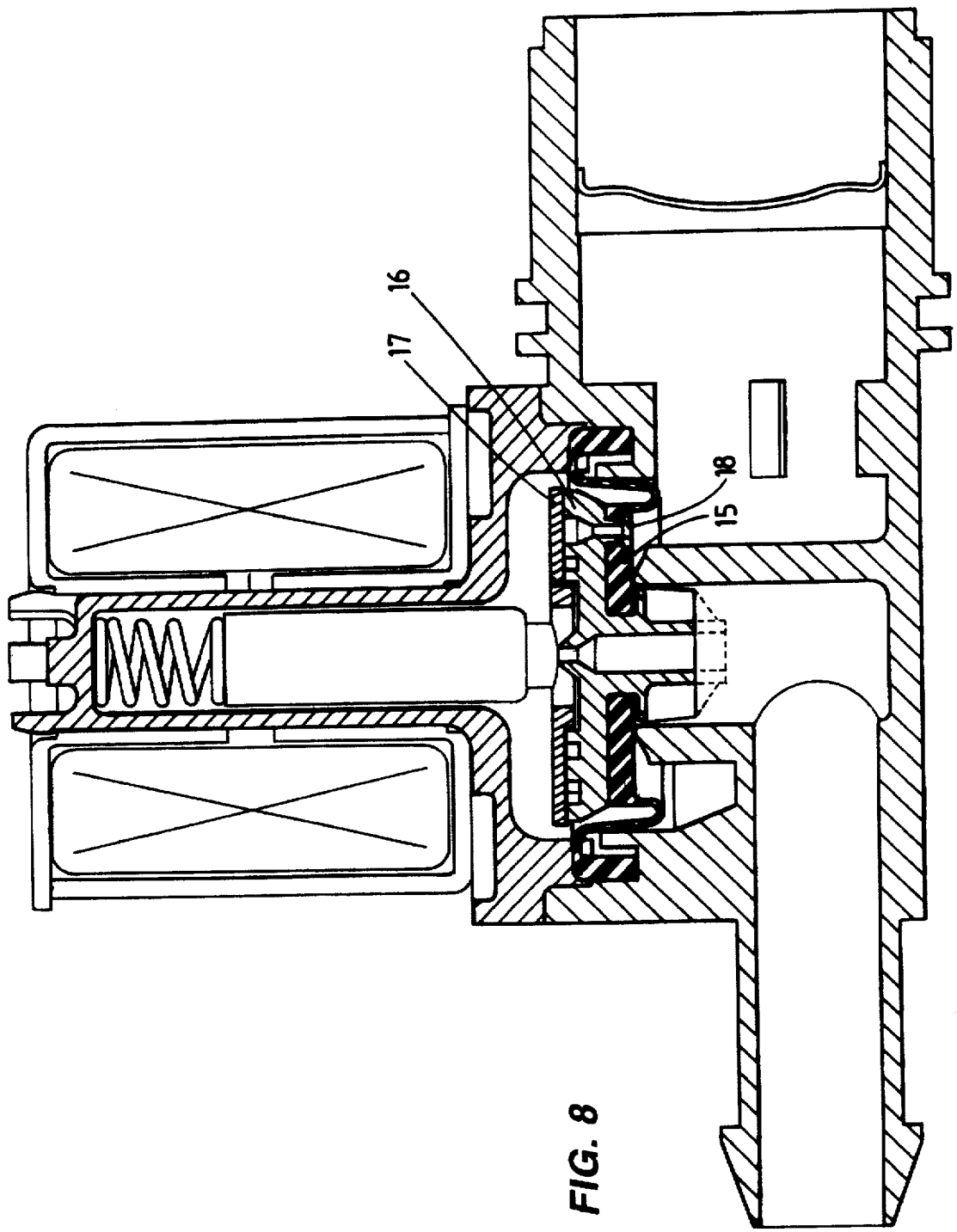
FIG. 8 is a cross-sectional view of another preferred embodiment of the soft closing valve wherein the inlet aperture is part of the tortuous path disc.

FIG. 8 is another embodiment utilising the principles of this invention. In this example, the primary aperture 18 is no longer constructed within the sealing diaphragm 15 but is now part of the tortuous path disc 16 which extends in part through the sealing diaphragm 15. The advantage of this type of arrangement is that it improves leak prevention.

Figure 9A:
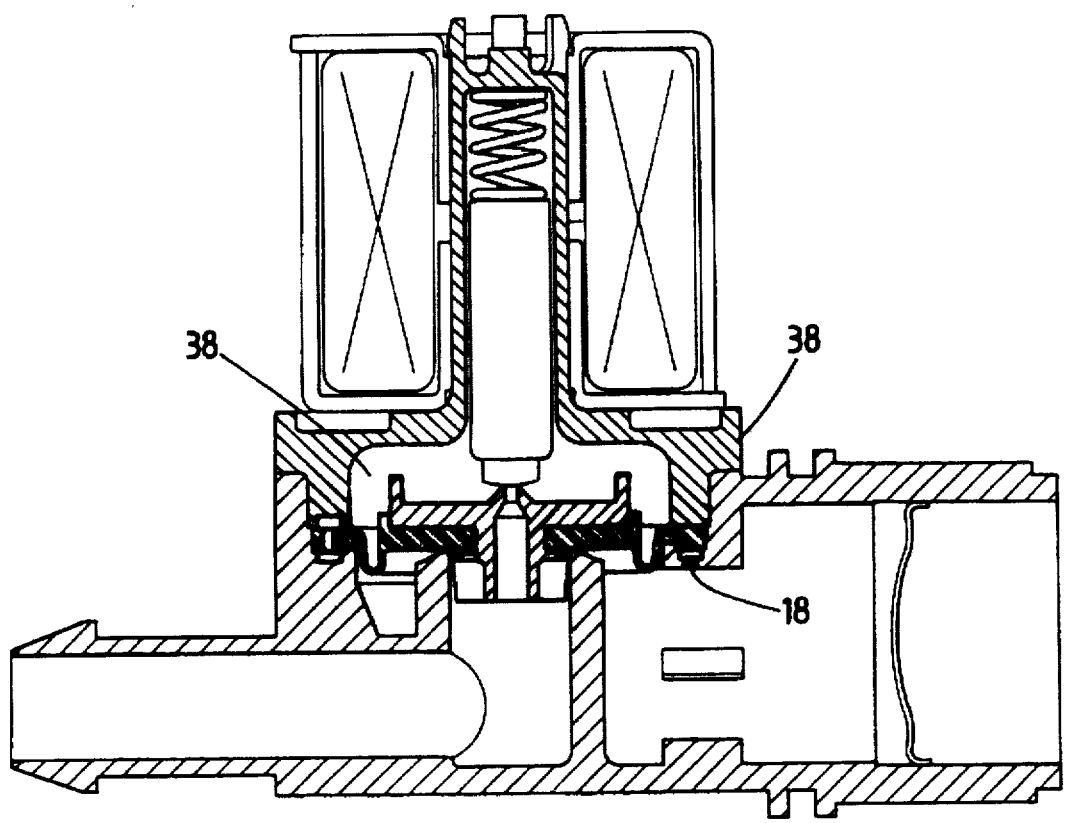
FIGS. 9a and b is a cross-sectional and a top view respectively of a yet further preferred embodiment illustrating the tortuous path now contained within the body of the valve and sealed by the periphery of the diaphragm and the upper valve housing.
Figure 9B:
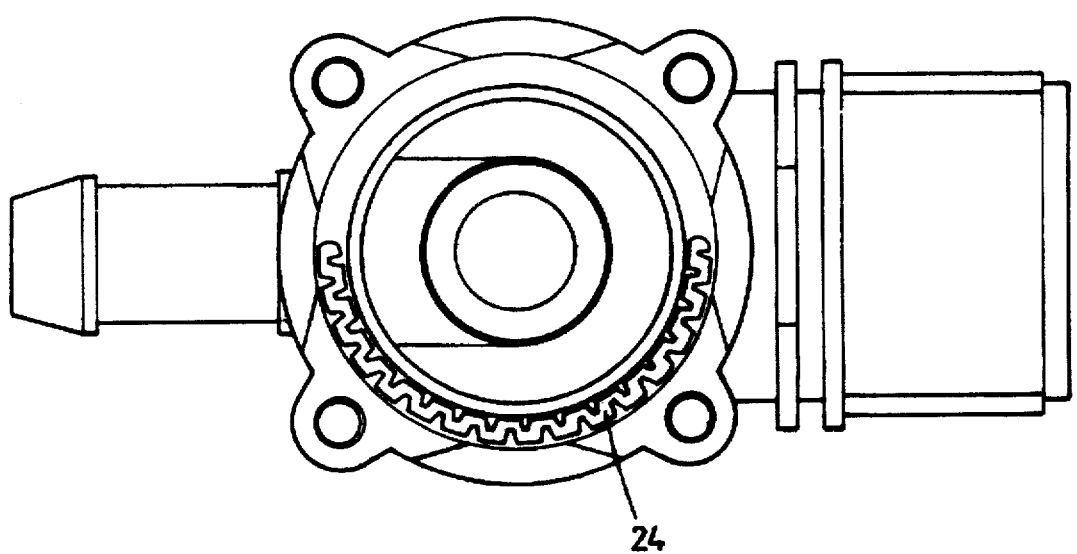

FIGS. 9a and b are the cross-sectional and top views of another embodiment of the soft closing valve. In this embodiment the secondary passageway 24, or tortuous path, is located on the valve body 37 and is sealed by the periphery of the sealing diaphragm 15 and the upper housing 38. This makes the tortuous path disc redundant and results in a much simplified arrangement.

Figure 10:
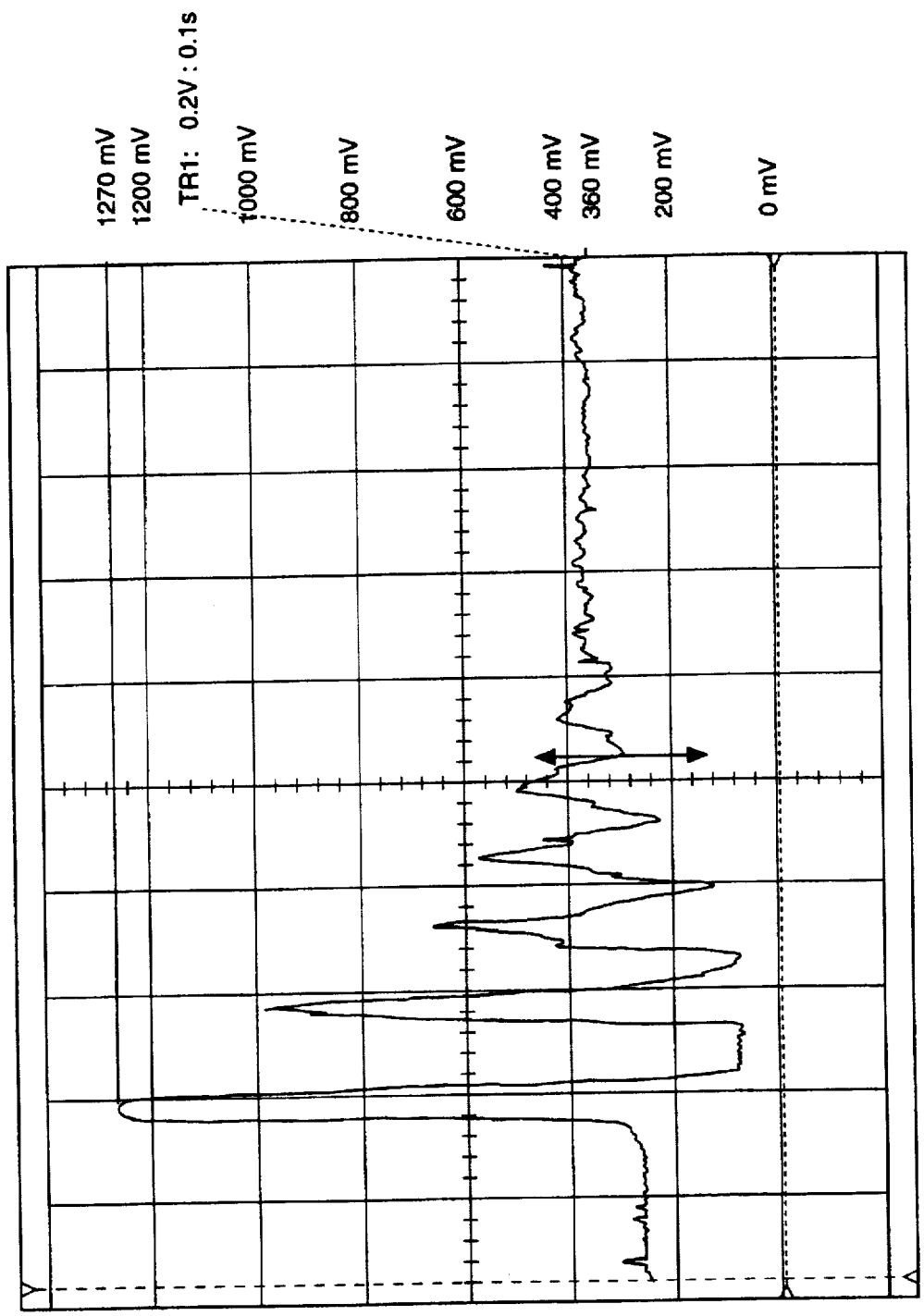
FIG. 10 is a plot of water pressure versus time when a standard valve is closed.
Figure 11:
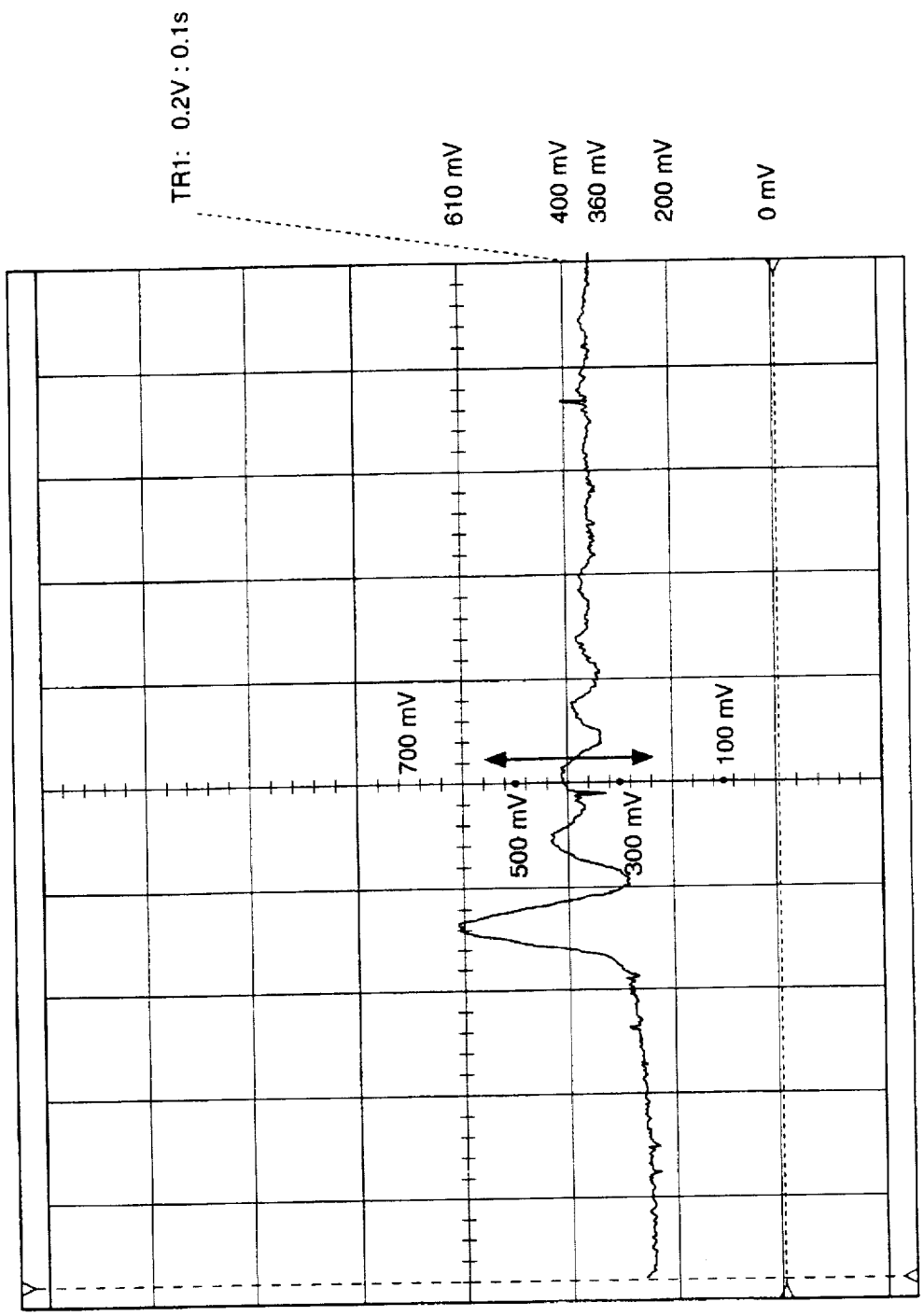
FIG. 11 is a plot of water pressure versus time for a typical soft closing valve as disclosed in this invention.

It has been experimentally found the use of a of tortuous path arrangement reduces the pressure pulse of the water hammer by about 70% in the case of a standard washing machine arrangement. This clearly not only reduces the stress on the plumbing components but also results in a substantial decrease of the audible noise of water hammer. FIGS. 10 and 11 show empirically determined pressure versus time data when closing a standard valve and a soft closing valve respectively. One can easily see that, at a mean pressure of 1440 kPa, the standard valve produces pressure peaks over 5000 kPa, whist the maximum observed when using the soft closing valve is 2440 kPa. Furthermore, the standard valve has a longer decay time as compared with the soft-closing valve.

Other tortuous paths may be used, for example; a cylindrical path with jagged edges, or a variable diameter pipe, the construction only limited by the physical shape constraints demanded by the particular valve application.

We claim:

1. A soft closing liquid valve comprising:

an inlet chamber and an outlet chamber in liquid communication with each other;

a third chamber having a first opening;

a seat defining a second opening between the inlet chamber and the outlet chamber;

a diaphragm assembly between the inlet chamber and the third chamber, the diaphragm assembly opposed and facing said seat and positioned across said second opening, said diaphragm assembly being movable for contacting said seat so as to provide a closure between the inlet and the outlet chambers;

a fourth chamber in liquid communication with the inlet chamber and third chamber;

at least two first conduits opening into the diaphragm assembly for liquid flow between the inlet chamber and the fourth chamber;

a second conduit for liquid flow between the fourth chamber and the third chamber; wherein the cross-sectional area of the second conduit is greater than the cross-sectional area of each of the first conduits thereby causing a filtering of debris in the liquid flowing to the fourth chamber;

a third conduit for liquid flow between the third chamber and the outlet chamber;

a plunger movable in response to a control memos to at least each of two positions, in one said position allowing for the passage of liquid through the third conduit and in the at least one other said position preventing the flow of liquid through the third conduit;

wherein the second conduit is so shaped to provide a continuous extended tortuous path along the diaphragm assembly and thus a restricted flow of liquid between the inlet chamber and the third chamber;

wherein the third conduit is so shaped so as to allow a greater flow of liquid through it than that through the second conduit; and wherein in use the valve is closed by the plunger moved to close the flow of liquid through the third conduit, the liquid flow into the third chamber through the first conduit, fourth chamber and second conduit resulting in a pressure increase on the diaphragm assembly causing it to move onto the seat and close direct liquid flow between the inlet and the outlet chambers, whereby the tortuous path shape of the second conduit causes a slow liquid flow rate into the third chamber and thus a correspondingly slow increase in pressure and a correspondingly slow rate of diaphragm assembly movement towards the seat resulting in the valve being soft closing.

2. A soft closing liquid valve as in claim 1 wherein there are at least four first conduits.

3. A soft closing liquid valve as in claims 1 or 2 wherein the first conduit or conduits is an aperture or apertures in the diaphragm assembly allowing liquid flow into the fourth chamber, said fourth chamber contained within the diaphragm assembly, said diaphragm assembly further including the second conduit allowing for liquid flow into the third chamber.

4. A soft closing liquid valve as in claim 1 or 2 wherein the third conduit is contained within the diaphragm assembly.

5. A soft closing liquid valve as in claim 1 or 2 wherein the second conduit is a tortuous path that provides a restricted flow of fluid through the diaphragm assembly from the fourth chamber to the third chamber.

6. A soft closing liquid valve as in claim 1 or 2 wherein the first conduit or conduits are so shaped so that their cross-sectional area is less than the cross-sectional area of the second conduit.

7. A soft closing liquid valve as in claim 1 or 2 wherein the cross-sectional area of the first conduit or conduits is approximately 0.25 mm$^2$ and the cross-sectional area of the second conduit is approximately 0.64 mm$^2$.

8. A soft closing liquid valve as in claim 1 or 2 wherein the control means is an electromagnetic solenoid means.

9. A soft closing liquid valve as in claim 1 or 2 wherein the diaphragm assembly is constructed of three components, the first component being a flexible sealing member adapted to effect a seal in contact with the said seat so as to prevent liquid flow between the inlet and the outlet chambers, the second component being a tortuous path disk of substantial rigid construction and adapted to be held within the flexible sealing member, and the third component being a rigid tortuous path cap adapted to be bonded to the tortuous path disk.

10. A soft closing liquid valve as in claim 9 wherein the first conduit or conduits is an aperture or apertures in the flexible seal member, the fourth chamber is a conduit with all its sides except the top side defined as a groove in the flexible seal member, the top side being provided by the tortuous path disk which defines the fourth chamber, the second conduit being a tortuous path defined by all its sides except the top side by the tortuous path disk said top side being provided by the tortuous path cap which thus defines the second conduit, the tortuous path disk including an inlet aperture and an outlet aperture for the second conduit.

11. A soft closing liquid valve as in claim 1 or 2 wherein the fourth chamber is a toroidal chamber or flow path.

12. A soft closing liquid valve as in claim 1 or 2 wherein the second conduit is located in the body of the soft closing valve.

13. A soft closing liquid valve as in claim 10 wherein the first conduit, fourth chamber and second conduit are located in the tortuous path disc.

14. A soft closing liquid valve comprising:

an inlet chamber and an outlet chamber in a liquid communication with each other;

a third chamber having a first opening;

a seat defining a second opening between the inlet chamber and the outlet chamber;

a diaphragm assembly between the inlet chamber and the third chamber, the diaphragm assembly facing said seat and positioned across said second opening, said diaphragm assembly being movable for contacting said seat so as to provide a closure between the inlet and the outlet chambers;

a fourth chamber in liquid communication with the inlet chamber and third chamber;

at least two first conduits opening into the diaphragm assembly for liquid flow between the inlet chamber and the fourth chamber;

a second conduit for liquid flow between the fourth chamber and the third chamber; wherein the cross-sectional area of the second conduit is greater than the cross-sectional area of each of the first conduits thereby causing a filtering of debris in the liquid flowing to the fourth chamber;

a third conduit for liquid flow between the third chamber and the outlet chamber;

a plunger movable in response to a control means to at least each of two positions, in one said position allowing for the passage of liquid through the third conduit and in the at least one other said position preventing the flow of liquid through the third conduit;

wherein the second conduit is so shaped to provide a continuous extended tortuous path along the diaphragm assembly and thus a restricted flow of liquid between the inlet chamber and the third chamber;

wherein the third conduit is so shaped so as to allow a greater flow of liquid than that through the second conduit;

and wherein when the plunger is controlled so as to open the flow of liquid through the third conduit, the liquid flow out of the third chamber through the third conduit into the outlet chamber is greater than the liquid flow into the third chamber through the first conduit, fourth chamber and second conduit, this difference in flow rate resulting in a force difference on the diaphragm assembly causing the diaphragm assembly to move off the seat and allow for direct liquid flow between the inlet and the outlet chambers.

* * * * *